(12) United States Patent
Bauer

(10) Patent No.: US 6,764,121 B1
(45) Date of Patent: Jul. 20, 2004

(54) TRUCK BED EXTENSION

(76) Inventor: Cordell Eric Bauer, 7003 Camino Del Vistazo, San Clemente, CA (US) 92673

( * ) Notice: Subject to any disclaimer, the term of this patent is extended or adjusted under 35 U.S.C. 154(b) by 0 days.

(21) Appl. No.: 10/658,990

(22) Filed: Sep. 9, 2003

Related U.S. Application Data

(63) Continuation-in-part of application No. 10/224,194, filed on Aug. 20, 2002, now Pat. No. 6,616,208, which is a continuation of application No. 09/994,281, filed on Nov. 26, 2001, now Pat. No. 6,435,588, which is a continuation-in-part of application No. 09/736,895, filed on Dec. 12, 2000, now Pat. No. 6,322,125, which is a continuation-in-part of application No. 09/247,651, filed on Feb. 9, 1999, now Pat. No. 6,158,797.

(51) Int. Cl.[7] ................................................. B60R 5/04
(52) U.S. Cl. ........................................ 296/37.6; 296/61
(58) Field of Search ......................... 296/26.08, 26.11, 296/26.1, 26.12, 26.13, 37.6, 55, 57.1, 61; 414/537

(56) References Cited

U.S. PATENT DOCUMENTS

| | | | |
|---|---|---|---|
| 4,472,639 A | 9/1984 | Bianchi | 296/26 |
| 4,531,773 A | 7/1985 | Smith | 296/26 |
| 4,596,417 A | 6/1986 | Bennett | 296/61 |
| 4,944,546 A | 7/1990 | Keller | 296/61 |
| 5,244,335 A | 9/1993 | Johns | 296/61 |
| 5,425,564 A | 6/1995 | Thayer | 296/57 |
| 5,468,114 A | 11/1995 | Hickerson | 296/61 |
| 5,538,307 A | 7/1996 | Otis | 296/61 |
| 5,597,195 A | 1/1997 | Meek | 296/61 |
| 5,645,394 A | 7/1997 | Hays | 414/547 |
| 5,752,800 A | 5/1998 | Brincks et al. | 414/537 |
| 5,755,480 A * | 5/1998 | Bryan | 296/26.01 |
| 5,788,311 A * | 8/1998 | Tibbals | 296/62 |
| 5,791,717 A * | 8/1998 | Reich et al. | 296/61 |
| 5,813,714 A * | 9/1998 | Lipinski et al. | 296/61 |
| 5,816,638 A * | 10/1998 | Pool, III | 296/26.11 |
| 5,823,596 A * | 10/1998 | Kulesza | 296/26.08 |
| 5,988,725 A * | 11/1999 | Cole | 296/61 |
| 5,993,135 A * | 11/1999 | Wolgamood | 414/537 |
| 6,059,344 A * | 5/2000 | Radosevich | 296/61 |
| 6,158,797 A * | 12/2000 | Bauer | 296/61 |
| 6,227,593 B1 * | 5/2001 | De Valcourt | 296/26.08 |
| 6,250,874 B1 | 6/2001 | Cross | 296/61 |
| 6,322,125 B2 | 11/2001 | Bauer | 296/26 |
| 6,435,588 B1 | 8/2002 | Bauer | 296/26 |

* cited by examiner

Primary Examiner—D. Glenn Dayoan
Assistant Examiner—Patricia Engle
(74) Attorney, Agent, or Firm—Niky Economy Syrengelas, Esq.; Crockett & Crockett

(57) ABSTRACT

A truck bed extension that is convertible into a truck bed separator to compartmentalize truck beds. The truck bed separator and extension are releasably attached to the truck bed lip at one end and to either the truck bed extension or the truck bed separator at the other end by a clamping assembly. The clamping assembly is comprised of a pair of mating jaw members for releasable attachment to a truck bed lip at on end and a fastener for releasable attachment to the hinge of the truck bed separator or extension at the other end.

17 Claims, 6 Drawing Sheets

TRUCK BED EXTENSION

This application is a continuation-in-part of U.S. application Ser. No. 10/224,194 filed Aug. 20, 2002, now U.S. Pat. No. 6,616,208, which is a continuation of U.S. application Ser. No. 09/994,281 filed Nov. 26, 2001, now U.S. Pat. No. 6,435,588 issued Aug. 20, 2002, which is a continuation-in-part of U.S. application Ser. No. 09/736,895 filed Dec. 12, 2000, now U.S. Pat. No. 6,322,125 issued Nov. 27, 2001, which is a continuation-in-part of U.S. application Ser. No. 09/247,651 filed Feb. 9, 1999, now U.S. Pat. No. 6,158,797 issued Dec. 12, 2000.

FIELD OF THE INVENTIONS

The invention relates to the field of truck design.

BACKGROUND OF THE INVENTIONS

Pick up truck cargo beds may be extended with the use of extensions added to the bed after manufacture of the truck. Ramps may also be fitted to the pick up truck to facilitate loading cargo. Both the truck bed extension and the ramp are often used as temporary modifications of a typical small pick up truck. Combining the functions of the truck bed extension and ramp, making the bed extension releasably attached from the truck, and minimizing the bulk of the truck bed extension, allows the owner of the truck to temporarily modify the truck to extend the bed, eliminates the need to carry a ramp to load, and provides for easier storage when not in use.

SUMMARY

The truck bed extension described below is releasably attached to a typical pick up truck bed to extend the back wall of the bed. The truck bed extension is comprised of three panels, including a back wall and two side walls, which are hinged together to allow the truck bed extension to be straightened when detached from the truck bed and used as a ramp or ladder. The truck bed extension includes rotational stops or rotational locks which maintain the extension in a straight condition when unfolded for use as a ramp. The rotational stops may take the form of U-channel rails protruding from the outside/bottom of the extension. Alternatively, the truck bed extension is comprised of a pair of ramps, each ramp comprising a back wall section, a side wall extension, and a ramp lip. When installed as a truck bed extension, the back wall sections nest against each other and are strapped together to re-establish the back wall for the truck bed. The truck bed extension may also be positioned within the truck bed to create compartments within the truck bed. This is desirable where a user is carrying cargo that has different storage criteria or where multiple-compartments are desired within a single truck bed.

DETAILED DESCRIPTION OF THE INVENTIONS

Figure 1:
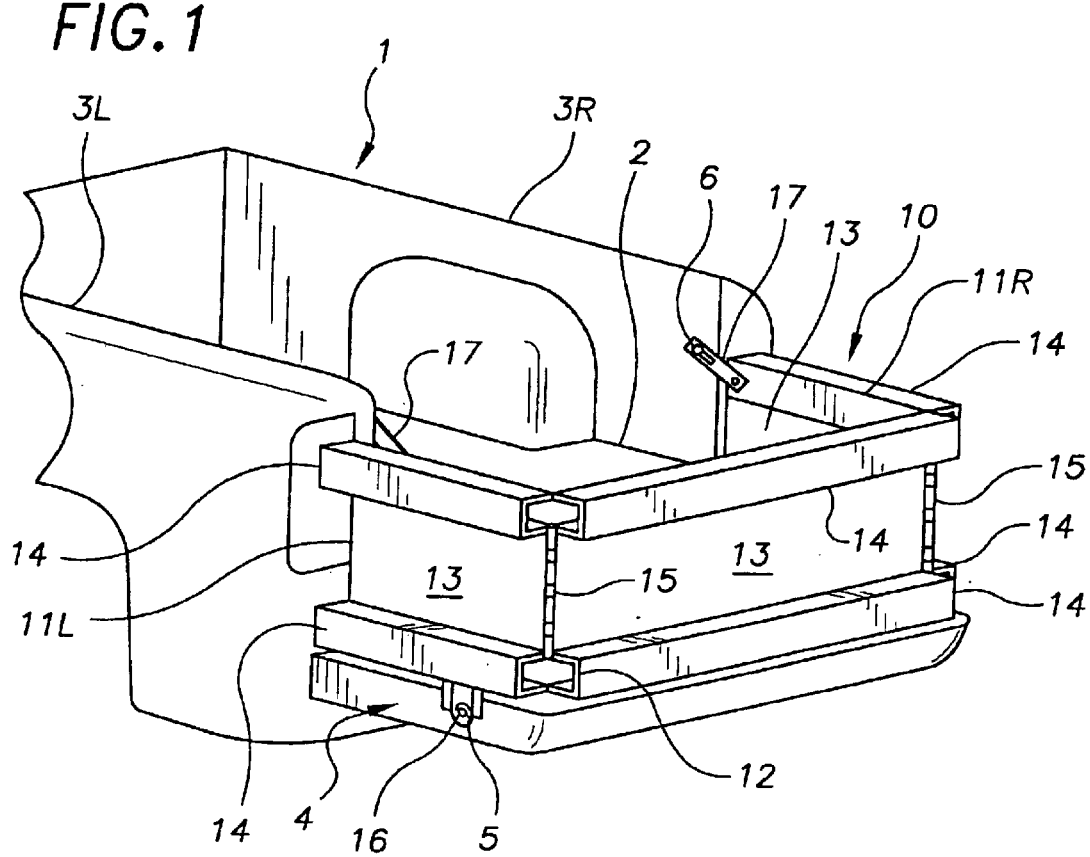
FIG. 1 is an illustration of the truck bed extension installed on a typical truck bed.

FIG. 1 is an illustration of the truck bed extension installed on a typical truck bed. The truck may be any truck, but for purposes of illustration it is a typical pick up truck with a truck bed 1. The truck bed is comprised of the truck bed floor 2, truck bed left and right sidewalls 3R and 3L, and the tailgate 4. The tailgate is hinged to the truck bed floor, and is shown in the open and fully lowered position. When raised, the tailgate is secured in the upright position when latches 5 on either side of the tailgate engage latch pins 6 near the back inside edge of the truck bed walls. The latches are raised by the lever handle on the outside of tailgate, which in this view is on the underside of the open tailgate. The truck bed extension 10 is shown installed on the truck bed. The tailgate is open, and typically lies flush with the truck bed floor, and will serve as an extension of the truck bed floor. The truck bed extension comprises a left side wall extension section 11L, right side wall extension section 11R, and back wall section 12 which reestablishes the back wall for the truck bed. The wall extensions 11L, 11R, and back wall section 12 may be made of aluminum or other strong material and may be of a solid construction, mesh, solid with holes, or may be made with slats or rungs like a ladder. The left side wall extension section and right side wall extension section are oriented at approximately right angles to the back wall section, and each section is. vertically oriented at substantially right angles from the lowered tailgate, forming the truck bed extension which rests on the lowered tailgate. Each section of the extension comprises a wall panel 13, and each wall panel has deep rails 14 at the top and bottom of the panel. The rails may be solid, but to limit the weight of the entire assembly, they are preferably made of U-channel or hollow rectangular extrusions. The back wall extension is joined to the side wall extensions with hinges such as the piano hinges 15 shown in the illustration or other hinges such as a pin and slot assembly.

The truck bed extension is releasably attached to the truck with hardware that matches the latches and latch pins of the truck (which are predetermined by the truck manufacturer). On the bottom edge of the side wall extensions, latch pin 16 extends from the side wall extension into mating relationship with the pre-existing latch 5 of the tailgate. On the upper forward areas of the side wall extensions, key holed latch plates 17 extend upwardly to the latch pins on the truck bed, and mate with the latch pins to secure the device in place on the truck bed. The latch pin and latch plates of the truck bed extension are configured to match the pre-existing truck bed latches and latch pins of the truck bed. By using the latching hardware of the truck and matching latching hardware on the truck bed extension, the extension latch pins 16 can be released from the tailgate latches 5 by operating the lever handle of the tailgate which is ordinarily used to open the tailgate. The latch plates 17 can be slipped off the truck bed latch pins 6, and the entire truck bed extension easily removed from the truck. Thus, the truck bed extension can be installed and removed from the truck bed without using tools.

Figure 3:
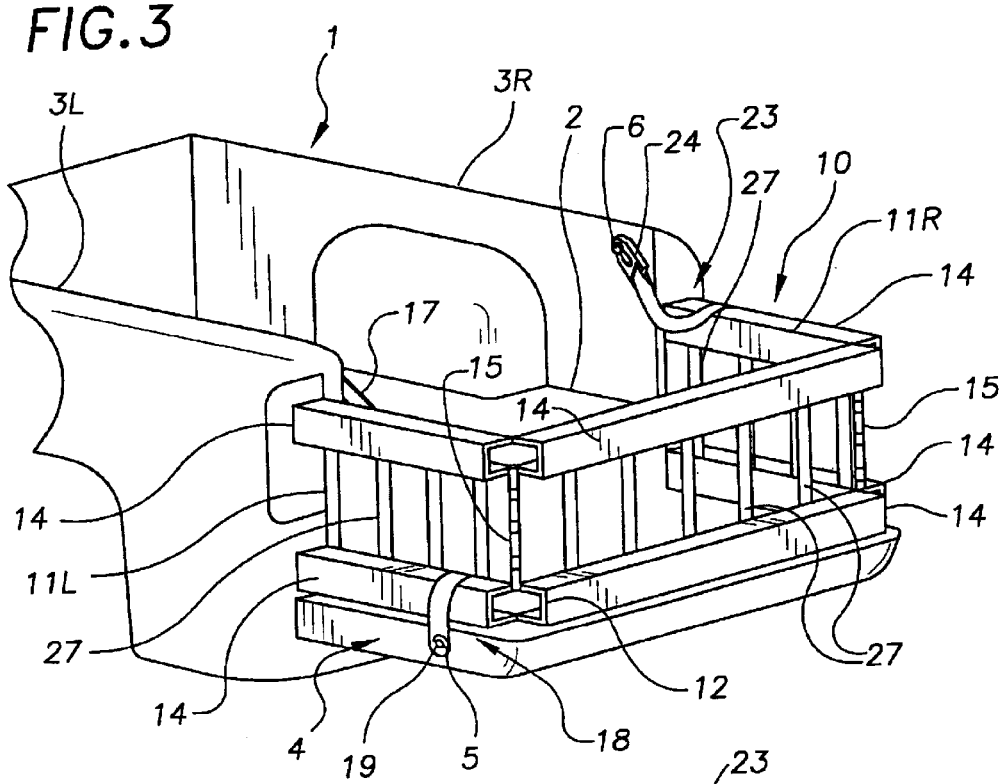
FIG. 3 is an illustration of the truck bed extension installed on a typical truck bed.
Figure 4:
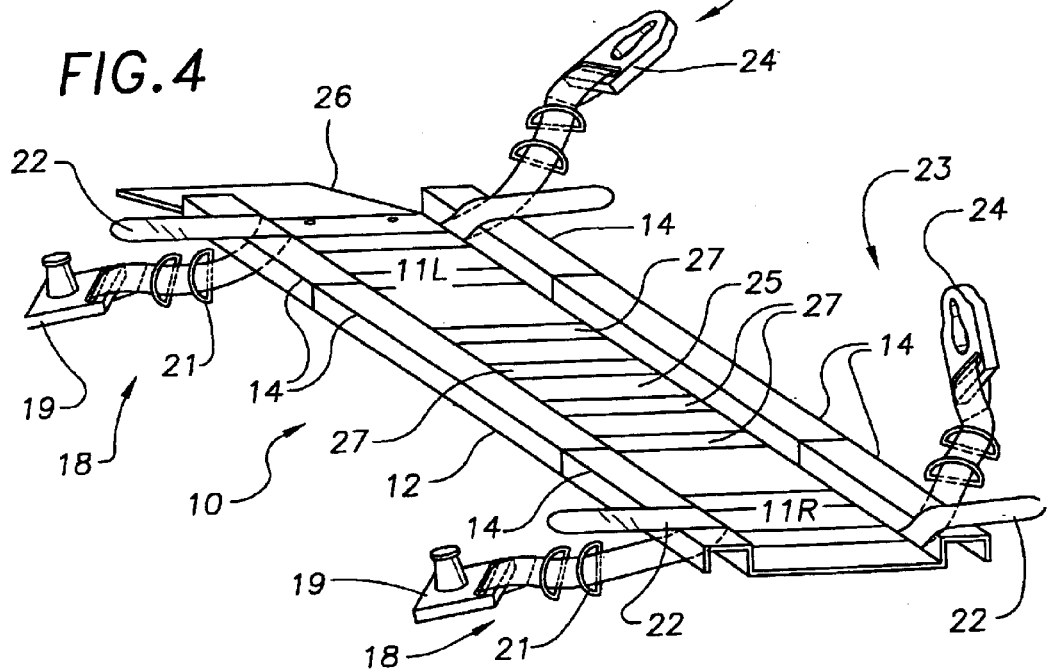
FIG. 4 is an illustration of the truck bed extension detached from the truck bed and unfolded to form a ramp.
Figure 5:
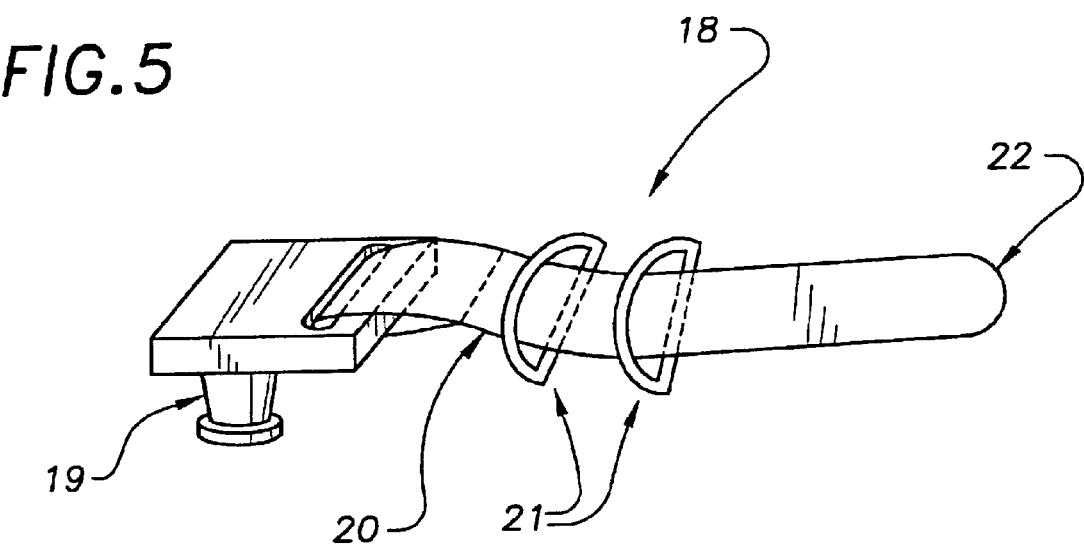
FIG. 5 is a strap assembly used to affix the truck bed extension to the truck tailgate.
Figure 6:
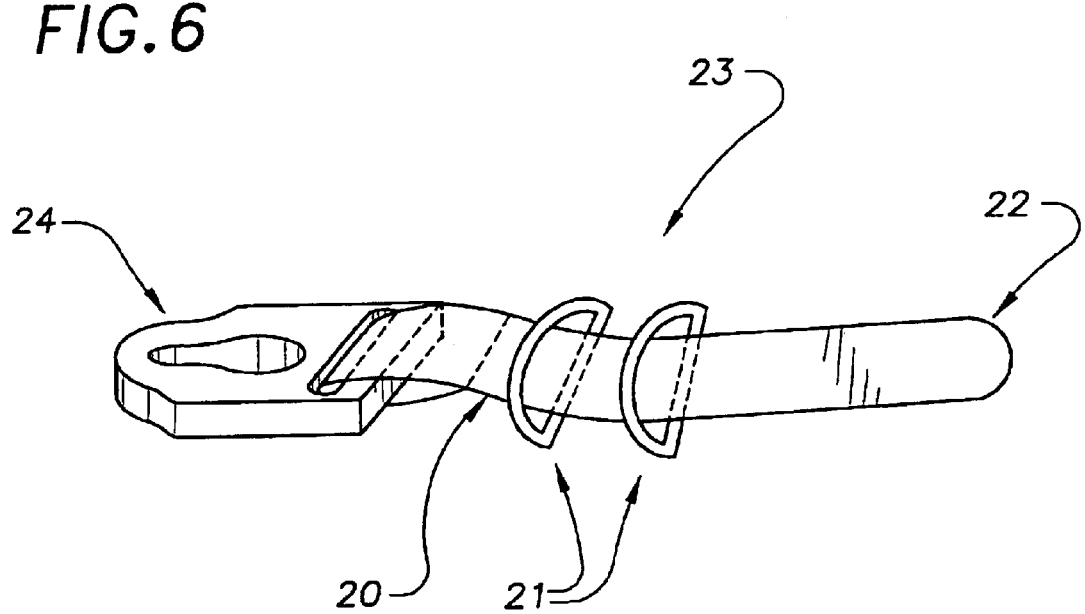
FIG. 6 is a strap assembly used to affix the truck bed extension to the inside of the truck bed wall.

Alternatively, the truck bed extension can be releasably attached to the truck with straps as shown in FIGS. 3 and 4 and detailed in FIGS. 5 and 6. FIGS. 3 and 4 illustrate the truck bed extension installed with straps as an alternate embodiment of the latching mechanism shown in FIG. 1. The advantage of a strap down assembly over pre-fixed hardware latch plate and latch pin assemblies is that it accounts for the variation in the drop or vertical placement of tailgate latches 5 and truck bed latch pin 6, making it easier to attach the truck bed extension to a number of different trucks with their specific tailgate latching mechanisms. FIGS. 3 and 4 also illustrate the wall extensions made of a rung construction, with numerous rungs 27 spanning between the rails 14 to create a surface suitable for rolling of a wheeled vehicle up or down the ramp.

FIG. 5 details a strap assembly 18 which comprises a latch pin 19 affixed at one end of a strap 20 and a set of D-rings 21 or the like a distance from the latch pin end of the strap assembly. The latch pin 19 mates with the tailgate latch 5. The end of the strap 22 loops under the rail 14 and feeds back and through the D rings 21, and when cinched fixes the truck bed extension 10 to the tailgate 4. FIG. 6 details a strap assembly 23 comprising a latch plate 24 affixed at one end of the strap 20 and a set of D-rings 21 or the like a distance from the door latch end of the strap assembly. The latch plate 24 is key-holed to mate with the truck bed latch pin 6. The end of the strap 22 loops under the rail 14 (or through the wall extension 11 if slatted) and feeds back and through the D rings 21, and when cinched fixes the truck bed extension 10 to the inside of the truck bed 3. The latch plate 24 and latch pin 19 configurations can vary depending on the type of truck for which the truck bed extension is being attached. FIGS. 5 and 6 show latch plate 24 and latch pin 19 configurations specially designed to work on a Ford F150™. Two sets of each strap assembly are used to affix the truck bed extension to the tailgate and truck bed as shown in FIG. 4 (only 1 set is pictured in FIG. 3). Alternatively, all four strap down assemblies could be bunge cords or straps with hooks.

Figure 2:
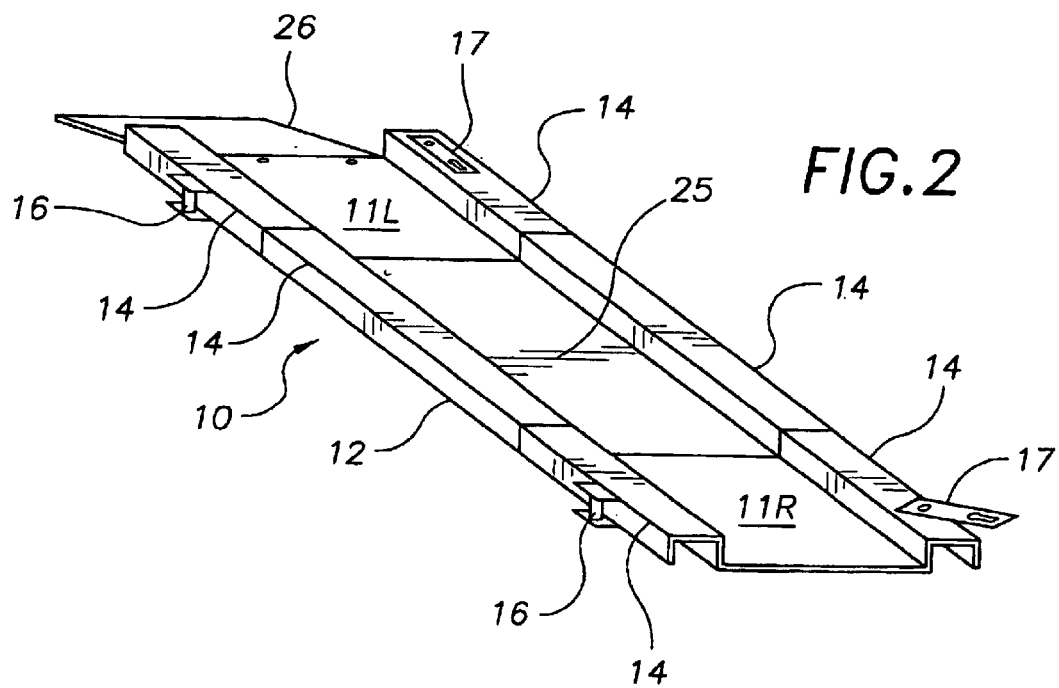
FIG. 2 is an illustration of the truck bed extension detached from the truck bed and unfolded to form a ramp.

The truck bed extension is convertible into a ramp which may be used to load cargo into the truck bed, and is well suited to facilitate rolling cargo such as motorcycles up into the truck bed. FIG. 2 is an illustration of the truck bed extension 10 detached from the truck bed and unfolded to form a ramp. The sidewall extensions 11R and 11L and backwall extension 12 unfold to form a straight ramp. The rails 14 extend upwardly from the walking surface 25 of the ramp and meet in interfering contact to prevent over-rotation of the hinge and maintain the sections in flat alignment. When the truck bed extension is in the straight configuration, the rails of the side wall extensions meet the rails of the back wall extension to limit unfolding of the sections about the hinges to maintain the ramp in a substantially straight configuration under load, and thus function as rotational stops. Rotational locks and locking hinges, such as those used on folding ladders, may also be employed to maintain the truck bed extension in the flat ramp configuration. The rails also function as side guards, preventing objects being transported on the ramp from sliding or rolling off the ramp. A ramp lip 26 may be provided on one or both side wall extensions, hinged to a side wall extension to permit the lip to be folded against the inside of the side wall extension when installed, and unfolded when the side wall extension is unfolded, creating a landing or level extension of the ramp for resting on the tailgate. The ramp lip need not necessarily be hinged to a side wall extension, but could be welded, bolted, or otherwise fastened to either side wall extension at a nominal angle to create the level extension. Further, the ramp lip could be an extension of either side wall extension and bent at the nominal angle to create the ramp extension.

Figure 7:
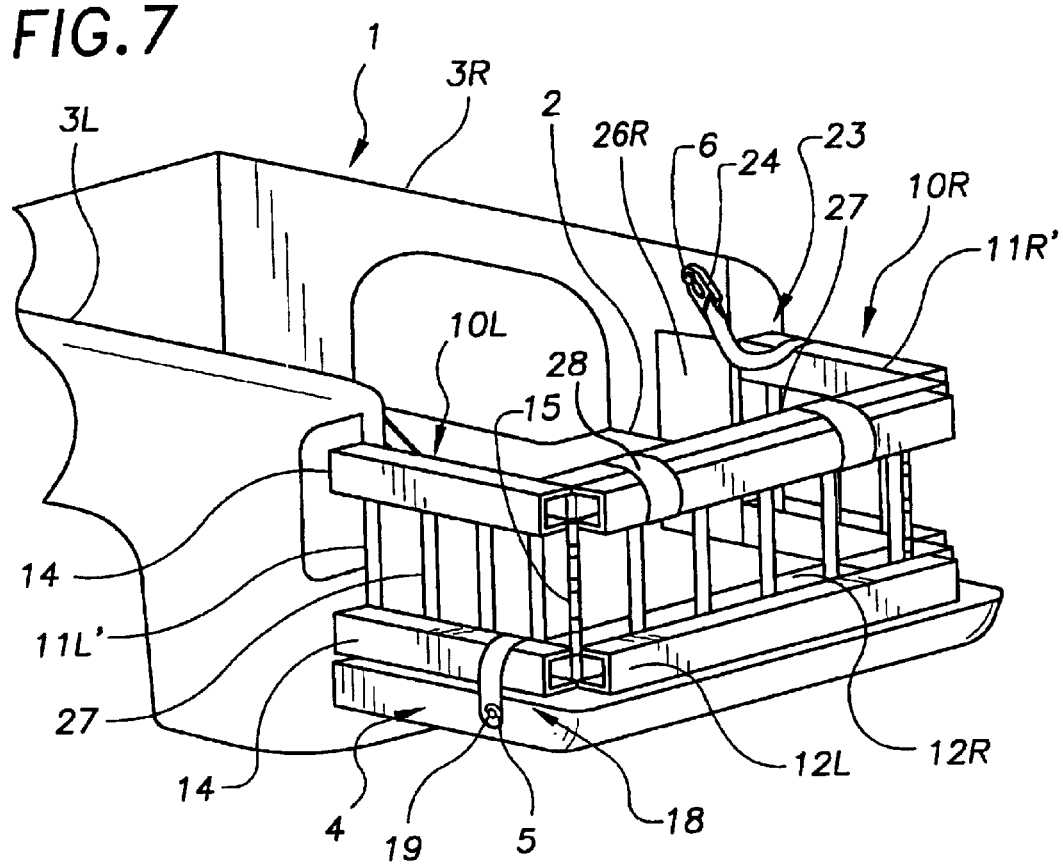
FIG. 7 is an illustration of the truck bed extension comprised of dual ramps installed on a typical truck bed.
Figure 9:
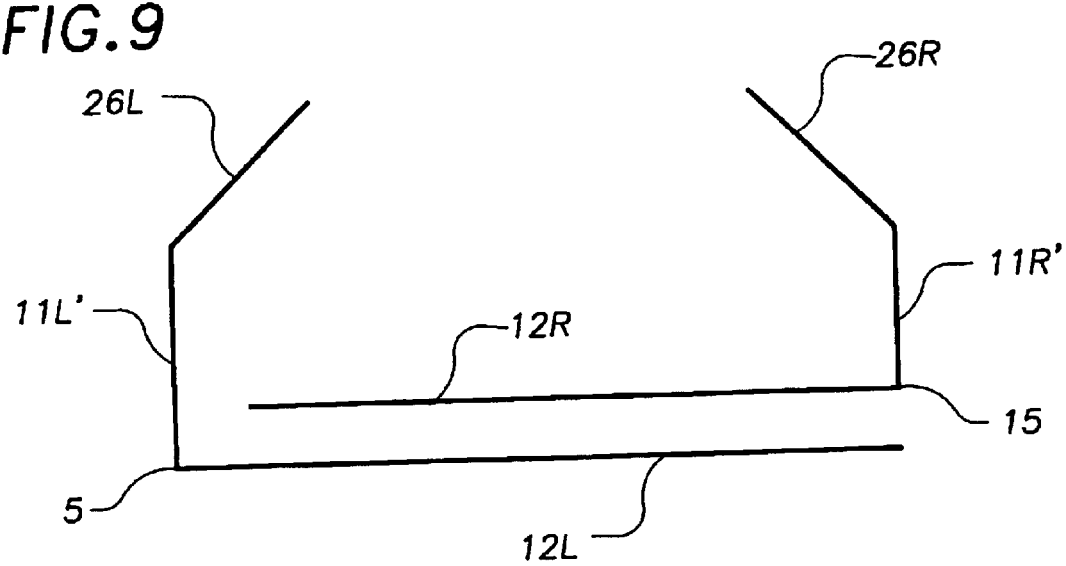
FIG. 9 is a top view of the left and right truck bed extensions of the dual ramp system which form the truck bed extension.
Figure 8:
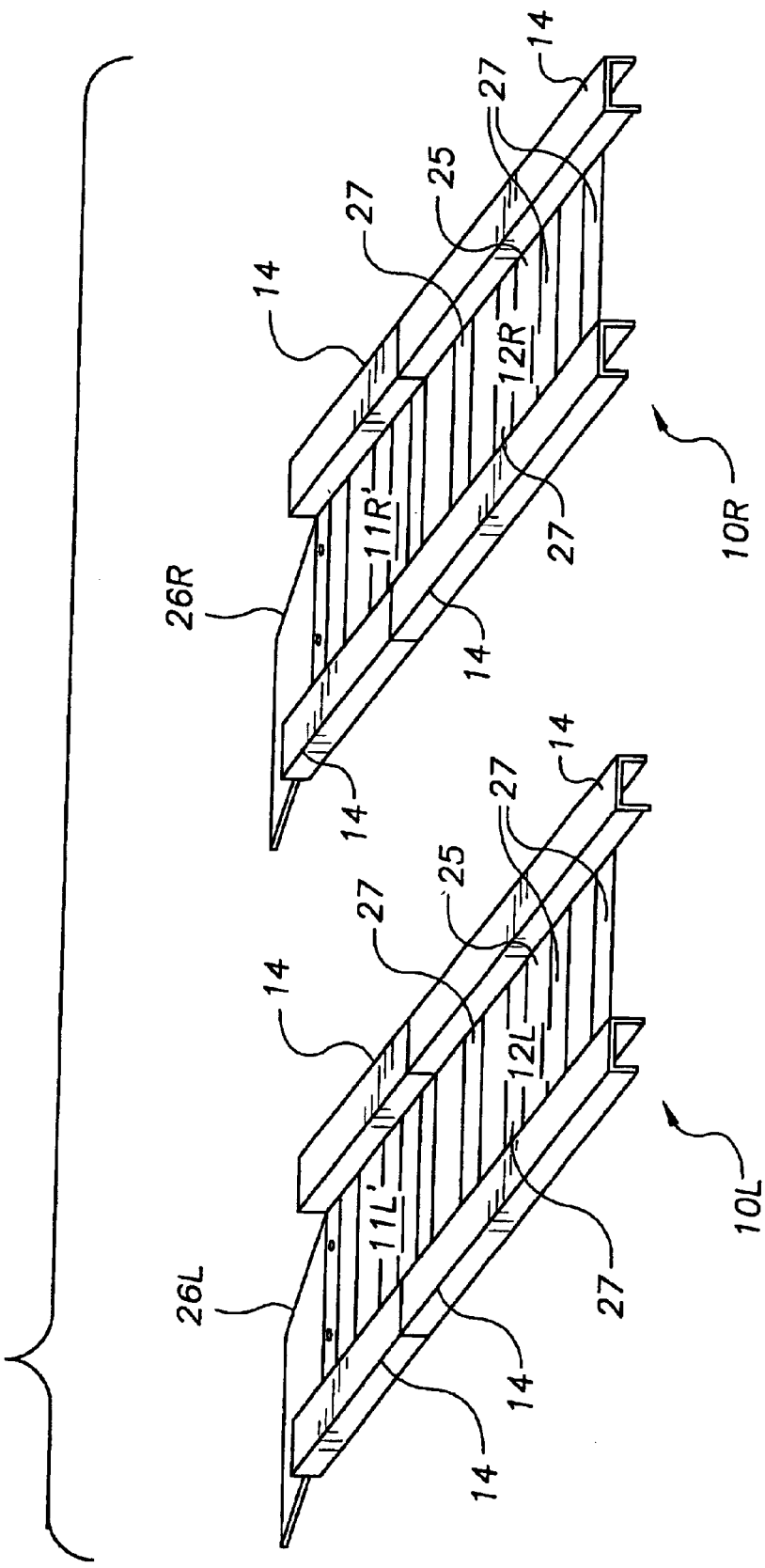
FIG. 8 is an illustration of the left truck bed extension and right truck bed extension detached from the truck bed and unfolded to form two ramps.

FIG. 7 is an illustration of another embodiment of a truck bed extension installed on a typical truck bed. The truck bed extension is comprised of a left truck bed extension 10L and a right truck bed extension 10R which, when detached from the truck bed can be used as a dual ramp to allow for loading of four wheeled vehicles (for example ATVs, riding lawnmowers, snowmobiles, race cars, and carts) and vehicles with wide rolling surfaces. FIG. 8 illustrates the left truck bed extension a 10L and right truck bed extension 10R detached from the truck bed and unfolded to form two ramps. The left truck bed extension comprises a ramp lip 26L, a left side wall extension section a 11L', and a back wall section 12L. The right truck bed extension comprises a ramp lip 26R, a right side wall extension section 11R', and a back wall section 12R. The back wall sections are joined to the left or right side wall extension sections with hinges 15. The ramp lip is attached to the left or right side wall extension sections with hinges or is welded, bolted or otherwise fastened. As shown in FIGS. 7 and 9, the back wall sections nest against each other and, when attached to one another, reestablish the back wall for the truck bed. The back wall sections may be held together by a strap 28 clip magnet or other means. As shown, the left side wall extension section is longer than the right side wall extension section so that the entire truck bed extension is square with the tailgate. Accordingly, the relative lengths of the back wall sections are adjusted such that the overall length of the ramps will be the same. Conversely, the right side wall extension section could be longer than the left side-wall extension section with the relative back wall sections adjusted accordingly. (The left and right side wall extensions may be of identical length, if looseness in the nested arrangement is tolerable, or adjustment in the strap down assembly length or latch plate location may be made to fix the position of the side wall sections in offset relationship allowing neatly parallel disposition of the two back wall sections 12L and 12R.) The left truck bed extension 10L and right truck bed extension 10R can be releasably attached to the truck with strap assemblies 18 and 23 as shown in FIG. 7, or with the extension latch pins 16 and latch plates 17 as shown in FIG. 1.

Figure 10:
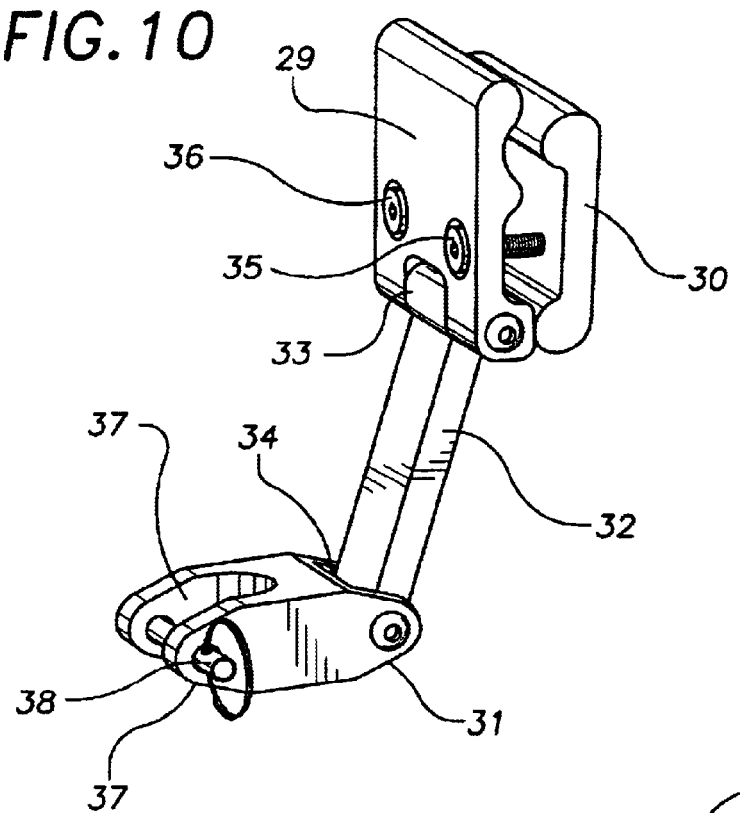
FIG. 10 is a clamp assembly used to affix the truck bed extension to the lip of the truck bed wall.

Alternatively, the truck bed extension is convertible into a truck bed separator, which may be used to create different sections within the truck bed. FIG. 10 is an illustration of a clamping assembly that can be used to releasably engage the truck bed extension to a truck bed lip at some distance within the truck bed. The placement of the truck bed separator or extension within the truck bed creates separate compartments within the truck bed so that the different compartments may be used for different purposes. The clamp assembly is comprised of a pair of mating jaws 29, 30 at one end and a fastener 31 at the second end. A shaft 32 is pivotally contained between the first and second ends of the clamp assembly. The shaft contains hinge connections at its first 33 and second ends 34. The mating jaws at one end of the clamp assembly are for releasable attachment to the lip of the truck bed wall. These jaws function as a clamp in order to releasably engage to the truck bed lip. One of the mating jaws 29 has at least one opening 35 for that houses a screw 36, pin, or other tightening rod for releasable engagement to the truck bed lip. When the pair of mating jaws are positioned over the truck bed lip, the tightening rod can be adjusted to close the clamp assembly and secure it to the lip. The tightening rods are dimensioned so that they can accommodate for truck lips of varying dimensions. Additionally, the tightening rods are dimensioned so that they can accommodate for various truck bed liners that may be contained on the truck bed. (Other releasable clamping mechanisms may be employed, including toggle clamp mechanisms, hand-operable clamping screws, and other suitable mechanisms.) The fastener at the second end of the clamp attaches to either the hinge 15 or the rungs of the truck bed extension. In this illustration, a latch plate 37 is contained on the fastener for releasable engagement with a latch pin 38 to secure the hinge of the ramp therebetween. However, the hinge may be engaged using a pin, clamp, screw, or even a lock. The use of other fasteners serves the dual purpose of securing the truck bed separator or extension, and locking the truck bed separator or extension in place so that it may not be removed by somebody other than the user.

Figure 11:
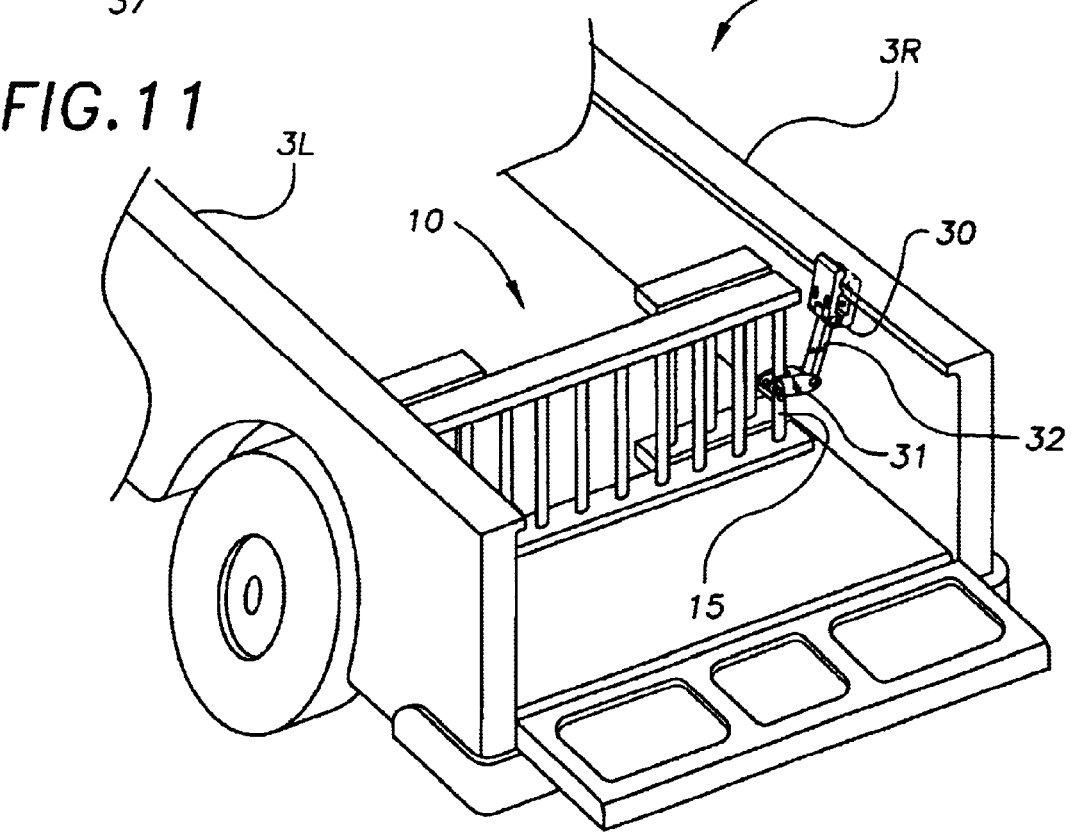
FIG. 11 is an illustration of the clamp assembly engaged within the truck bed.

FIG. 11 illustrates the truck bed separator or extension a in stalled with the clamp assembly. At one end of the clamp assembly, the mating jaws 29, 30 are releasably engaged to the truck bed lip 39. At the other end of the clamp assembly, the fastener is releasably engaged to either the hinge or rung of the truck bed separator or extension. Once both ends are securely engaged, the clamp assembly holds the truck bed separator or extension in and upright position at an approximately 90° angle to the floor of the truck bed. This positioning of the truck bed extension or separator at such a location divides the truck bed into separate compartments.

Alternatively, the clamp assembly can be used instead of the latching mechanism shown in FIG. 1 and the straps shown in FIGS. 3 and 4. Once completely engaged, the fastener is secured to the side wall extension member at one end and the mating jaws are secured to the truck bed lip at the other end. The advantage, of the clamping assembly over the pre-fixed hardware latch plate and latch pin assemblies and straps is that the clamp assembly is not configured to be utilized with any pre-existing latching hardware of any particular truck model. Instead, the clamp assembly may be universally utilized. Once engaged with the clamp assembly, the truck bed separator or extension will be securely attached to the truck bed. This will ensure the truck bed separator or extension will not open until required to do so. Additionally, the clamping assembly secures the truck bed separator or extension so that it is stable, even with the tail gate open.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A truck bed separator for use with a truck with a truck bed wherein the truck bed comprises a truck bed floor, left and right truck side walls, a truck bed lip on top of the truck side walls, a tailgate hinged to the truck bed floor and having means for releasably attaching the tailgate to the side walls, said tailgate capable of being lowered to comprise an essentially flat extension of the truck bed floor, said truck bed separator comprising:

a left side wall separator section, a right side wall separator section, and a back wall section, said left side wall separator section and right side wall separator section being rotatably joined by hinges to the back wall section;

hinge for securing a ramp lip to one of said side wall separator sections;

a clamping assembly for releasable attachment of truck bed lip to at least one of the hinges of the back wall section;

said left side wall separator section, right side wall separator section, and back wall section having a folded configuration in which the left side wall separator section and right side wall separator section are oriented at approximately right angles to the back wall section, forming a truck bed separator which may rest at some distance within the truck bed floor; and said left side wall separator section, right side wall separator section, and back wall section having a straight configuration in which the left side wall separator section and right side wall separator section are oriented in approximately straight alignment to the back wall section.

2. The truck bed separator of claim 1 wherein the clamping assembly comprises:

a pair of mating jaw members for releasable attachment to a truck bed lip at the jaws proximal ends;

a fastener for releasable attachment to the hinge of the back wall section at the fasteners distal end; and a shaft between the pair of mating members and the fastener wherein a first end of the shaft is hinged to the distal end of the pair of mating jaws and the second end of the shaft is hinged to the proximal end of the fastener.

3. The truck bed separator of claim 2 wherein one of the mating jaw members has at least one aperture for a tightening rod.

4. The truck bed separator of claim 3 wherein the fastener is comprised of a latch plate and a latch pin.

5. The truck bed separator of claim 3 wherein the fastener is comprised of a latch plate and a screw.

6. The truck bed separator of claim 3 wherein the fastener is comprised of a clamp.

7. The truck bed separator of claim 3 wherein the fastener is comprised of a lock.

8. The truck bed separator of claim 2 wherein said left side wall separator section, right side wall separator section, and back wall section each comprise a wall panel having a top edge and a bottom edge, with rails extending along the top edge and bottom edge of the wall panel, said rails extending from the wall panels so that, when the truck bed separator is in a straight configuration forming a ramp, the rails of the side wall separator sections meet the rails of the back wall section to limit unfolding of the sections about the hinges and maintain the ramp in said straight configuration, and wherein the ramp lip can be positioned on the extended tailgate of the truck and supported thereby.

9. The truck bed separator of claim 4 wherein the wall panel is comprised of a plurality of rungs spanning between the rails along the top edge and bottom edge of said wall panel.

10. A truck bed separator for use with a truck with a truck bed wherein the truck bed comprises a truck bed floor, a left side wall and a right side wall, a truck bed lip on to of the truck side walls, a tailgate hinged to the truck bed floor and having latching mechanisms for releasably attaching the tailgate to the side walls by mating with complementary latching mechanisms on each side wall, said tailgate capable of being lowered to comprise an essentially flat extension of the truck bed floor, said truck bed extension comprising:

a left truck bed separator comprising
a first ramp lip, a left side wall separator section, and a first back wall section, said left side wall separator section and first ramp lip being rotatably joined by hinges to said first back wall section;

a right truck bed separator comprising
a second ramp lip, a right side wall separator section, and a second back wall section, said right side wall separator section and second ramp lip being rotatably joined by hinges to said second back wall section;

a clamp fastener for releasably attaching the left truck bed separator to the left truck side wall;

a clamp fastener for releasably attaching the right truck bed separator to the right truck side wall;

a means for releasably attaching the first back wall section to the second back wall section;

said left truck bed separator and right truck bed separator having a folded configuration in which the left side wall separator section is oriented at an approximately right angle to the first back wall section and the right side wall separator section is oriented at an approximately right angle to the second back wall section, and where the first back wall section is releasably attached to the second back wall section forming a truck bed separator which may rest on the truck bed;

said left truck bed separator having a straight configuration in which the left side wall separator section is oriented in approximately straight alignment to the first back wall section;

said right truck bed separator having a straight configuration in which the right side wall separator section is oriented in approximately straight alignment to the second back wall section; and said left side wall separator section being longer than said right side wall separator section so that the left truck bed separator and right truck bed separator when in the folded configuration is square with the tailgate and wherein the first back wall section is shorter than the second back wall section such that the overall length of the left and right truck bed separators when in the straight configuration are of the same length.

11. The truck bed separator of claim 10 wherein the clamping assembly comprises:

a pair of mating jaw members for releasable attachment to a truck bed lip at the jaws proximal ends;

a fastener for releasable attachment to the hinge of the back wall at the fasteners distal end; and a shaft between the pair of mating members and the fastener wherein a first end of the shaft is hinged to the distal end of the pair of mating jaws and the second end of the shaft is hinged to the proximal end of the fastener.

12. The truck bed separator of claim 11 wherein one of the mating jaw members has at least one aperture for a tightening rod.

13. The truck bed separator of claim 12 wherein the fastener is comprised of a latch plate and a latch pin.

14. The truck bed separator of claim 12 wherein the fastener is comprised of a latch plate and a screw.

15. The truck bed separator of claim 12 wherein the fastener is comprised of a clamp.

16. The truck bed separator of claim 12 wherein the fastener is comprised of a lock.

17. The truck bed separator of claim 10 wherein said left side wall separator section, right side wall separator section, first back wall section and second back wall section each comprise a wall panel having a top edge and a bottom edge, with rails extending along the top edge and bottom edge of the wall panel, said rails extending from the wall panels, wherein the wall panel is comprised of a plurality of rungs spanning between the rails along the top edge and bottom edge of said wall panel.

* * * * *

UNITED STATES PATENT AND TRADEMARK OFFICE
CERTIFICATE OF CORRECTION

PATENT NO. : 6,764,121 B1
DATED : July 20, 2004
INVENTOR(S) : Bauer

It is certified that error appears in the above-identified patent and that said Letters Patent is hereby corrected as shown below:

Column 5,
Lines 22 through 23, the term "a in stalled" should read -- 10 installed --.

Signed and Sealed this

Twenty-third Day of November, 2004

JON W. DUDAS
*Director of the United States Patent and Trademark Office*